United States Patent Office 2,875,187
Patented Feb. 24, 1959

2,875,187
SUSPENSION POLYMERIZATION USING SORBITOL, METHYL CELLULOSE AND GELATIN

James R. Gerhard II, West Lawn, Pa., assignor to The Firestone Tire & Rubber Company, Akron, Ohio, a corporation of Ohio No Drawing. Application February 1, 1957
Serial No. 637,631

3 Claims. (Cl. 260—92.8)

The invention relates to an improved suspension polymerization process for the production of vinyl chloride resins having excellent "dryness" characteristics, i. e., the resins produced rapidly imbibe large amounts of plasticizer and other liquid compounding ingredients without losing their characteristics as dry, free-flowing, granular materials.

The suspension polymerization process has come into wide use in the preparation of vinyl chloride resins, since, as compared to emulsion-produced resins, the resins produced in suspension are less contaminated by inorganic impurities, and have improved general working properties. Resins produced by the conventional suspension polymerization processes, however, have an undesirable "wet" characteristic—i. e., when they are blended in the usual dry-mixing machines with liquid plasticizers and other liquid compounding ingredients, these ingredients are not imbibed into the interior of the resin granules, but remain as an oily surface coating thereon. The resultant compositions are not free-flowing, which introduces considerable difficulty into the handling thereof. Moreover, the resins do not behave well in the hot-milling process to which they must be subjected at a later stage in the processing; the liquid ingredients lubricate the granules so that they are not subjected to a proper milling action. As a result, the milling process is unduly prolonged, and the milled compositions contain numerous unassimilated granules of resin which show up as "fisheyes" and other discontinuities in the finished products made therefrom.

A particular desideratum in resins designed for dryblending with plasticizers is that the resins when blended with plasticizers shall have good "hot-flow." Resins are generally dry-blended with plasticizers in blade-type mixing machines heated to temperatures on the order of 185–220° F. It is desirable, when the plasticizer has been completely absorbed by the resin, that the hot mixture should drop cleanly and freely from the mixer blades and from the mixing machine surfaces. This behavior is called "hot-flow," and is not achieved in the case of most commercial resins. It is desirable that this state be reached with as short a mixing time as possible.

Subsequent to the dry blending, the mixture of resin and plasticizer is forwarded to a mill, or Banbury mixer or else directly to an extruder, in which the mixture is heated, fused and subjected to shearing to produce a homogeneous fused mass. The more rapidly a resin becomes completely homogenized in such treatment (as evidenced by the disappearance of the discontinuities known as "fish-eyes" from the blend) the more highly the plasticizer absorption of the resin is rated.

In the process of polymerizing vinyl chloride in suspension, considerable difficulty is frequently experienced with the building up of polymer cake ("wall polymer") upon the walls and other surfaces of the polymerization reactor. Also many suspending agents give trouble from foaming during the discharge of the suspension from the reactor, and during the stripping of the unreacted monomers therefrom.

Accordingly, it is an object of this invention to produce vinyl chloride resins having improved dryness characteristics.

Another object is to provide a novel suspension polymerization process for the production of vinyl chloride resins of improved dryness characteristics.

Another object is to provide such a process which will yield polymers of improved "hot-flow" characteristics.

Another object is to provide such a resin which will homogenize rapidly during hot milling.

Still another object is to provide a novel suspending agent system which will avoid the difficulties of wall polymer build-up and foaming during polymerization of vinyl chloride.

A further object is to provide such a process which may be carried out without extensive alteration of existing equipment, and which will make full use of such equipment.

SYNOPSIS OF THE INVENTION

The above and other objects are secured, in accordance with this invention, in a process in which vinyl chloride, or a mixture thereof with minor proportions of other unsaturated compounds copolymerizable therewith, is polymerized in suspension in an aqueous medium containing dissolved therein, as a composite suspending agent, a mixture of

| | Parts by weight |
|---|---|
| Gelatin | [1].03–.12 |
| Methyl cellulose | [1].03–.14 |
| Sorbitol | [1].03–.10 |

[1] Per 100 parts by weight of aqueous suspension medium.

The resultant polymerized products have excellent plasticizer absorptivity by the criteria set forth above. Particularly, the hot-flow properties are enhanced if a high rate of agitation is maintained during the polymerization.

THE VINYL CHLORIDE AND COMONOMERS UTILIZABLE THEREWITH

As noted hereinabove, the process of this invention is applied to the polymerization of vinyl chloride, either alone or in admixture with minor proportions of other ethylenically unsaturated compounds copolymerizable therewith. The amount of any such comonomers used is sufficiently small, say up to 20% based on the total weight of vinyl chloride plus such comonomers, that the resultant polymeric product consists essentially of polyvinyl chloride chains having occasional interspersed units derived from the comonomers, these units being insufficient in number to radically change the essentially polyvinyl chloride character of the chains. Suitable unsaturated compounds for copolymerization with vinyl chloride include for instance, vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like. For a fairly complete list of materials known to polymerize with vinyl chloride, reference may be had to Krczil, "Kurzes Handbuch der Polymerisations, Technik, II Mehrstoff poylymerisation," Edwards Bros. Ins., 1945, pp. 735–747, the items under "Vinyl Chlorid." As a rough rule, the criterion of a practical comonomer for use with vinyl chloride to produce copolymers containing 80% or more of vinyl chloride, is that (on a mole percentage basis) an initial charge of 96% vinyl chloride, balance comonomer, shall yield an initial copolymer containing (a) at least 90% vinyl chloride and (b) not more than 99% vinyl chloride. On this basis, satisfactory co-monomers for use with vinyl chloride will be those having "$Q_2$" and "$e_2$" values, as described in J. Polymer Science 2: 101, correlated as follows, assuming for vinyl chloride $$Q_{vinyl\ chloride} = .03 \text{ and } e_{vinyl\ chloride} = .3$$

$$4.1 > \frac{\frac{.029 e^{-.3(.3-e_2)}}{Q_2} + .04}{1.33 Q_2 e^{e_2(.3-e_2)} + .96} > .37$$

Instead of the single unsaturated comonomers of the type above indicated, mixtures of such comonomers may enter into the copolymers, it being understood that the total quantity thereof shall be small enough (i. e., not over 20% based on the weight of the copolymer) that the essential character of the polyvinyl chloride chain is retained.

THE SUSPENSION POLYMERIZATION PROCESS

The suspension polymerization process in connection with which this invention is practiced comprises agitating and dispersing the vinyl chloride and any comonomers in an aqueous medium, containing dissolved therein the gelatin, methyl cellulose and sorbitol in the proportions set forth hereinabove. The intensity of agitation should be sufficient to keep the monomeric material suspended, without being sufficiently intense to convert the mixture to a permanent emulsion. For commercial reactors of 50 or more gallons, agitation of Pfaudler intensities in the range of 5.0 to 15.0 and preferably in the upper portion of the range, say 10–15, will be used, the higher intensities yielding polymers having improved "hot-flow." A polymerization initiator of a type soluble in the monomer phase is included in the charge, suitable initiators of this type being acyl peroxides such as benzoyl peroxide, dichlorobenzoyl peroxide, acetyl peroxide, lauryl peroxide, caproyl peroxide, peracetic acid, perbenzoic acid and the like; and the hydrocarbon peroxides, and hydroperoxides such as t-butyl hydroperoxide, cumene hydroperoxide, ascaridole and the like. The initiator system in some cases also includes a redox system including an oxidizing agent (commonly supplied by the peroxide initiator) a versivalent metal compound (e. g., an iron compound) and a reducing agent (e. g., benzoin). All of these materials must be soluble in the monomer phase, as the dispersion is not sufficiently intimately admixed to permit the redox components to be in the aqueous phase as would be the case with emulsion polymerization. For this reason, the sorbitol cannot be relied upon to provide the reducing component of any redox system in the operation of this invention. The polymerization is usually carried out at temperatures in the range of 45° to 100° C. which range may be broadened to 0° to 100° C. where active catalyst systems (such as those involving redox combinations) are employed. The polymerization is continued until at least about 75% of the monomers have become polymerized, at which time polymerization conditions are discontinued, and the inert solvents and any unreacted monomers are vented.

The technique of using the combination of suspending agents in accordance with this invention for the production of plasticizer-absorptive resins may be used in combination with other techniques directed to the same end, providing, of course, these other techniques are not inconsistent with the technique of this invention. For instance, under any conventional system of suspension polymerization, the absorptivity of the resin product can be greatly enhanced by stopping the polymerization reaction before it has proceeded to completion; this technique may be practiced concurrently with the practice of this invention and will result in a resin having enhanced porosity over the resin obtained in accordance with either technique practiced alone. A particularly useful technique, which the present applicant has practiced in connection with the use of mixtures of suspending agents in accordance with this invention, consists in the addition of a small amount of an inert solvent to the monomers to be polymerized. This technique appears to cooperate in a particularly favorable manner with the mixtures of suspending agents in accordance with this invention, and yields resins having absorptive properties far better than might be expected from experience with either of the techniques practiced alone. In general, these particularly superior results will be achieved if the polymerization charge includes from 0.5 to 25%, based on the weight of vinyl chloride, of an inert solvent for the vinyl chloride. Most conveniently, this solvent is mixed with the vinyl chloride before charging, or is otherwise incorporated into the original polymerization charge. However, the disadvantageous occurrences tending to result in wet resin in suspension polymerization processes appear to take place chiefly in the later stages of the polymerization reaction; the advantage of this supplemental technique is therefore secured in processes according to this invention in which the solvent is added before these later stages, say before more than about 50% of the monomers have undergone polymerization.

Suitable inert solvents for incorporation with the polymerization mixtures in order to further enhance the dryness of resins produced in accordance with this invention include any organic solvents for vinyl chloride which do not solvate or swell polyvinyl chloride, and which are not polymerizable and are not sufficiently reactive with free radicals to adversely affect the polymerization reaction. Likewise, the solvent must have a sufficient vapor pressure, say at least 50 mm. at 40° C., in order that it may be stripped at the close of the polymerization reaction. Such solvents include, for instance, benzene, toluene, butane, pentane, hexane, heptane, petroleum ether, naphtha, ethylene dichloride, propylene, isobutane, isopentane, ethyl chloride, the isomeric trichloroethanes, cyclohexane, neopentane, neohexane, methyl formate and the like.

With the foregoing general discussion in mind, there are given herewith detailed specific examples of the practice of this invention. All parts given are by weight.

Example 1

| | Pounds |
|---|---|
| Vinyl chloride | 85 |
| Lauroyl peroxide | ⎫ |
| Gelatin (100 bloom type) | ⎪ |
| Methyl cellulose (15 centiposie type) | ⎬ Varied per Table I. |
| Crystallized sorbitol | ⎪ |
| Trichloroethylene | ⎪ |
| Toluene | ⎭ |
| Water | 175 |

A series of polymerization batches was made up in accordance with the foregoing schedule, varying the nature and proportions of certain of the ingredients as set forth in Table I below. In each case the ingredients were charged into a 50-gallon reactor provided with an anchor stirrer, the free space of which had been purged with vinyl chloride vapor. The agitator was set in rotation at 123 revolutions per minute, providing an agitation intensity of 13 on the Pfaudler scale, which agitation was maintained throughout the polymerization reaction.

The above ingredients were placed in an Abbé #10 standard mixer (manufactured by the Paul O. Abbé Co.) and mixed at 200° F. with a blade speed of 77 R. P. M. Samples were removed at intervals, and pressed between sheets of white bond paper. The earliest time at which a sample produced no oily mark on the paper was recorded as the "dry-up time."

TABLE I

| Gelatin | Methyl Cellulose | Sorbitol | Lauroyl Peroxide (pounds) | Trichloroethylene (pounds) | Toluene (pounds) | Particle Size, Percent Held On | | | | Fisheyes After Milling | | | Dry-Up Time (Min.) | Run No. |
|---|---|---|---|---|---|---|---|---|---|---|---|---|---|---|
| | | | | | | 60 mesh | 80 mesh | 100 mesh | 200 mesh | 3 Min. | 4 Min. | 6 Min. | | |
| .10 | .15 | .05 | .25 | 0 | 0 | 5.2 | 51.8 | 23.0 | 12.2 | 6 | 0 | 0 | 22 | 1 |
| .10 | .14 | .10 | .34 | 0 | 1.14 | 0 | 3.0 | 27.0 | 60.0 | 17 | 13 | 5 | 26 | 2 |
| .10 | .14 | .10 | .34 | 0 | 1.14 | 0 | 3.0 | 17.0 | 67.0 | 50 | 10 | 3 | 14 | 3 |
| .10 | .14 | .12 | .34 | 0 | 1.14 | 0 | 0.4 | 7.0 | 78.4 | 130 | 59 | 11 | 12 | 4 |
| .10 | .12 | .12 | .34 | 0 | 1.14 | 0 | 9.4 | 12.4 | 68.0 | 21 | 15 | 4 | 15 | 5 |
| .10 | .08 | .10 | .34 | 0 | 1.14 | 0 | 24.2 | 19.3 | 49.6 | 180 | 70 | 8 | 10 | 6 |
| .10 | .14 | .12 | .34 | 0 | 1.14 | 0 | 3.0 | 13.8 | 16.8 | 50 | 50 | 14 | 14 | 7 |
| .10 | .18 | .12 | .34 | 0 | 1.14 | 0 | 0.6 | 12.2 | 64.4 | 19 | 5 | 3 | 20 | 8 |
| .10 | .12 | .16 | .34 | 0 | 1.14 | 0 | 0.4 | 12.8 | 66.2 | 27 | 7 | 3 | 26 | 9 |
| .10 | .12 | .10 | .34 | 0 | 1.14 | 0 | 0 | 15.2 | 74.8 | 9 | 5 | 4 | 16 | 10 |
| .10 | .10 | .10 | .34 | 0 | 1.14 | 1.8 | 35.4 | 19.6 | 34.2 | 26 | 13 | 1 | 40 | 11 |
| .10 | .16 | .12 | .26 | .30 | .50 | 2.0 | 34.0 | 22.0 | 36.0 | 28 | 11 | 1 | 12 | 12 |
| .10 | .16 | .12 | .26 | .30 | .50 | 7.0 | 33.2 | 21.8 | 30.2 | 15 | 5 | 0 | 14 | 13 |
| .10 | .14 | .14 | .26 | .30 | .50 | 0.6 | 24.2 | 25.2 | 48.0 | 24 | 8 | 2 | 18 | 14 |
| .06 | .14 | .14 | .26 | .30 | .50 | 19.2 | 41.6 | 12.0 | 22.0 | 20 | 12 | 4 | 14 | 15 |
| .10 | .14 | .14 | .26 | .30 | .50 | 13.6 | 39.6 | 10.3 | 23.6 | 10 | 7 | 1 | 12 | 16 |

The temperature was adjusted to 50° C., and these conditions of agitation and temperature were continued for 24 hours. At the end of this time the temperature was lowered to 25° C., the unreacted monomer vented, and the resultant slurry of granular or polyvinyl chloride discharged, dewatered on a filter, washed on the filter with water, and dried. The resultant polymers were then tested for various plasticizer absorption properties, as follows:

Hot-flow:

| | Parts |
|---|---|
| Resin under test | 100 |
| Dioctyl phthalate | 60 |
| Stearic acid | 0.25 |
| Lead carbonate | 10.0 |
| Calcium carbonate | 15.0 |
| No. 33 clay | 20.0 |

The above ingredients were placed in a ribbon mixer provided with a heating jacket maintained at 275° F. In the case of each of the resins of this invention, at the end of about 30 minutes' mixing, the mix began to fall freely from the blades. The mixer was then dumped, the mix flowing clearly and freely from the machine. The mix could be stored for extended periods without caking. The above behavior is characteristic of resins having good "hot-flow."

*Particle size.*—The resin under test was shaken through stacked screens. The percentage by weight of each resin retained on the several screens is recorded in Table I. It will be seen that the particle size of the resins produced in accordance with this invention are closely grouped in the 80–200 mesh range.

*Fisheyes.*—Each blend prepared as described above under "hot-flow" was tested by placing 100 grams of the mix on a 6-inch laboratory roll mill maintained with a roll gap of .040", and a roll surface temperature of 155° C. Samples of the film on the roll were cut off at the end of three, four and six minutes' milling, and the fisheyes counted on samples of the film eight square inches in area. The results are set forth in Table I, and it will be seen that the resins of this invention form homogeneously compounded milled blends with very short milling times.

Abbé mixer absorption rate:

| | Pts. |
|---|---|
| Resin under test | 100 |
| Dioctyl phthalate | 50 |
| Co-precipitated barium-cadmium laurate | 2 |
| Chelating agent (stabilizer) | 1 |

From the foregoing general description and detailed specific examples, it will be evident that this invention provides a novel and highly effective method for the production of vinyl chloride resins having excellent absorptivity for liquid plasticizers, and excellent flow behavior after absorption of the plasticizers, both at high and at low temperatures. No unusual or expensive reagents are required, and the process may be carried out with a minimum of skilled attendance.

What is claimed is:

1. Process which comprises polymerizing, in suspension in an aqueous medium, a monomeric material selected from the group consisting of vinyl chloride and mixtures thereof with up to 20%, based on the weight of said mixture, of other ethylenically unsaturated compounds copolymerizable therewith, said aqueous medium having dissolved therein

| | Parts by weight |
|---|---|
| Gelatin | [1].03–.12 |
| Methyl cellulose | [1].03–.14 |
| Sorbitol | [1].03–.10 |

[1] Per 100 parts by weight of aqueous medium.

2. Process which comprises polymerizing vinyl chloride in suspension in an aqueous medium, said aqueous medium having dissolved therein

| | Parts by weight |
|---|---|
| Gelatin | [1].03–.12 |
| Methyl cellulose | [1].03–.14 |
| Sorbitol | [1].03–.10 |

[1] Per 100 parts by weight of aqueous medium.

3. Process which comprises polymerizing vinyl chloride in the presence of from 0.5 to 25%, based on the weight of the vinyl chloride, of an inert solvent for the vinyl chloride, in suspension in an aqueous medium, said aqueous medium having dissolved therein

| | |
|---|---|
| Gelatin | [1].03–.12 |
| Methyl cellulose | [1].03–.14 |
| Sorbitol | [1].03–.10 |

[1] Per 100 parts by weight of aqueous medium.

References Cited in the file of this patent

UNITED STATES PATENTS

| 2,388,600 | Collins | Nov. 6, 1945 |
| 2,388,602 | Kiar | Nov. 6, 1945 |
| 2,673,192 | Hill | Mar. 23, 1954 |

OTHER REFERENCES

The Merck Index, Merck & Co., Rahway, N. J. (6th ed.), 1952, pp. 895–96, "sorbitol."